(12) United States Patent
Auyeung et al.

(10) Patent No.: US 8,861,599 B2
(45) Date of Patent: Oct. 14, 2014

(54) CONTEXT REDUCTION FOR LAST TRANSFORM POSITION CODING

(75) Inventors: Cheung Auyeung, Sunnyvale, CA (US); Wei Liu, Beijing (CN)

(73) Assignee: Sony Corporation, Tokyo (JP)

(*) Notice: Subject to any disclaimer, the term of this patent is extended or adjusted under 35 U.S.C. 154(b) by 426 days.

(21) Appl. No.: 13/415,554

(22) Filed: Mar. 8, 2012

(65) Prior Publication Data

US 2012/0230402 A1 Sep. 13, 2012

Related U.S. Application Data

(60) Provisional application No. 61/450,414, filed on Mar. 8, 2011.

(51) Int. Cl.
*H04N 7/50* (2006.01)
*H04N 19/136* (2014.01)
*H04N 19/176* (2014.01)
*H04N 19/13* (2014.01)
*H04N 19/132* (2014.01)

(52) U.S. Cl.
CPC ... *H04N 19/00121* (2013.01); *H04N 19/00139* (2013.01); *H04N 19/00278* (2013.01); *H04N 19/00127* (2013.01)
USPC ...................................... 375/240.12; 382/247

(58) Field of Classification Search
None
See application file for complete search history.

(56) References Cited

U.S. PATENT DOCUMENTS

| 6,856,701 | B2 | 2/2005 | Karczewicz et al. |
| 2009/0175332 | A1 | 7/2009 | Karczewicz et al. |
| 2012/0082233 | A1* | 4/2012 | Sze et al. ................ 375/240.18 |
| 2012/0082235 | A1* | 4/2012 | Lou et al. ................ 375/240.18 |

OTHER PUBLICATIONS

Hong et al.,-"Arithmetic Coding with Adaptive Context—Tree Weighting for the H.264 Video Coders"—Proc. of the SPIE Visual Comm. and Image Processing, vol. 5308, 2004, pp. 1226-1235 (pp. 1-10).

* cited by examiner

*Primary Examiner* — William C Vaughn, Jr.
*Assistant Examiner* — Michael Bennett
(74) *Attorney, Agent, or Firm* — John P. O'Banion (57) ABSTRACT

A context reduced last transform (CRLT) coding technique which enhances parallel context processing, such as utilized in JCTVC-D262, to reduce complexity by reducing the number of context models using for coding the position of the last significant transform coefficient. Selected context models are removed and additional bins are shared which reduce the number of contexts required. In one benchmark test for YUV 4:2:0 video, the number of context models were reduced from 120 for the proposed entropy encoding of JCTVC-D262 test model HM 2.0, versus 82 context models required for CRLT coding.

19 Claims, 6 Drawing Sheets

| 0 | 1 | 2 |

FIG. 4A

| 0 | 1 | 2 | 3 | 3 | 5 | 5 |

FIG. 4B

| 0 | 1 | 2 | 3 | 3 | 5 | 5 | 7 | 7 | 7 | 7 | 9 | 9 | 9 | 9 |

FIG. 4C

| 0 | 1 | 2 | 3 | 3 | 5 | 5 | 7 | 7 | 7 | 7 | 9 | 9 | 9 | 9 | 11 | 11 | 11 | 11 | 12 | 12 | 12 | 12 | 13 | 13 | 13 | 13 | 14 | 14 | 14 | 14 |

CONTEXT REDUCTION FOR LAST TRANSFORM POSITION CODING

CROSS-REFERENCE TO RELATED APPLICATIONS

This application claims priority from U.S. provisional patent application Ser. No. 61/450,414 filed on Mar. 8, 2011, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to video coding, and more particularly to reducing the number of contexts utilized when coding last transform position.

2. Description of Related Art

The efficient storage and communication of video requires coding mechanisms for reducing spatial and temporal redundancies. Ongoing efforts are directed at increasing the efficiencies of these enCOder/DECoders (codecs) which respectively compress and decompress video data streams. The purpose of codecs is to reduce the size of digital video frames in order to speed up transmission and reduce storage space. Video coding advances have collectively contributed to the high levels of coding efficiency provided by state-of-the-art codecs. Development continues on codec standards, such as from the Joint Collaborative Team on Video Coding (JCT-VC), which is a joint effort of the MPEG and VCEG standardization committees.

In one developing standard (JCTVC-D262), context processing within the entropy encoder section is performed with the position of the last significant coefficient encoded before the position of the other significant coefficients to improve the parallel nature of processing and thus throughput. This technique is performed during entropy encoding, such as within a context adaptive binary arithmetic coding (CABAC) entropy encoder, which is a lossless compression technique used in H.264/MPEG-4 AVC video encoding, and other recent coding standards, to improve video compression. CABAC decoding requires significant levels of processing power.

The position of the last coefficient is encoded explicitly by signaling its X and Y coordinates with a unary code, with the X and Y signaling being considered independently. Context derivation for this significance map of contexts is simplified toward further enhancing the parallel nature of the entropy encoding. The X and Y signaling are independent, as are luminance and the chrominance signaling. Utilizing this technique for YUV 4:2:0 video, a total of 120 contexts are used for coding the last coefficient position.

It will be noted that a "context model" utilized within this entropy coding technique is a probability model for one or more bins of the binarized symbol. A context model is chosen from a selection of available context models depending on the statistics of coded data symbols. The context model stores the probability of each bin being "1" or "0".

However, parallel entropy encoding utilizing this developing standard still requires the use of a large number of contexts which increase processing overhead.

BRIEF SUMMARY OF THE INVENTION

Accordingly, the present invention provides enhanced parallel entropy encoding requiring fewer contexts which overcomes shortcomings of previous approaches. The present invention is a new context assignment technique for context reduced last transform (CRLT) position coding, as an enhancement to parallel coding utilizing multiple contexts proposed in JCTVC-D262. In this new context assignment technique, bins are shared in response to bin width, with all but the first three bins sharing a context model with at least one other bin. For YUV 4:2:0 video, this invention reduces the number of contexts for coding the last transform position proposed in JCTVC-D262 from 120 to 82.

Further aspects and embodiments of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 3A through FIG. 3D are diagrams showing conventional context models utilized in parallel coding utilizing multiple contexts proposed in JCTVC-D262.

FIG. 4A through FIG. 4D are diagrams showing context reduced last transform (CRLT) position coding according an embodiment of the present invention.

DETAILED DESCRIPTION OF THE INVENTION

The present invention provides for reduction in the number of context models when performing parallel coding of the position of the last transform coefficient during a video encoding process. This inventive technique is referred to herein as context reduced last transform (CRLT) coding. In this technique, the context assignments for X and Y are performed in the same manner. The first N bins, such as three bins, have their own context, and each bin having a width less than a given threshold, such as four bins, has its own separate context model. All bins except the first three bins share context with at least one other bin.

Figure 1:
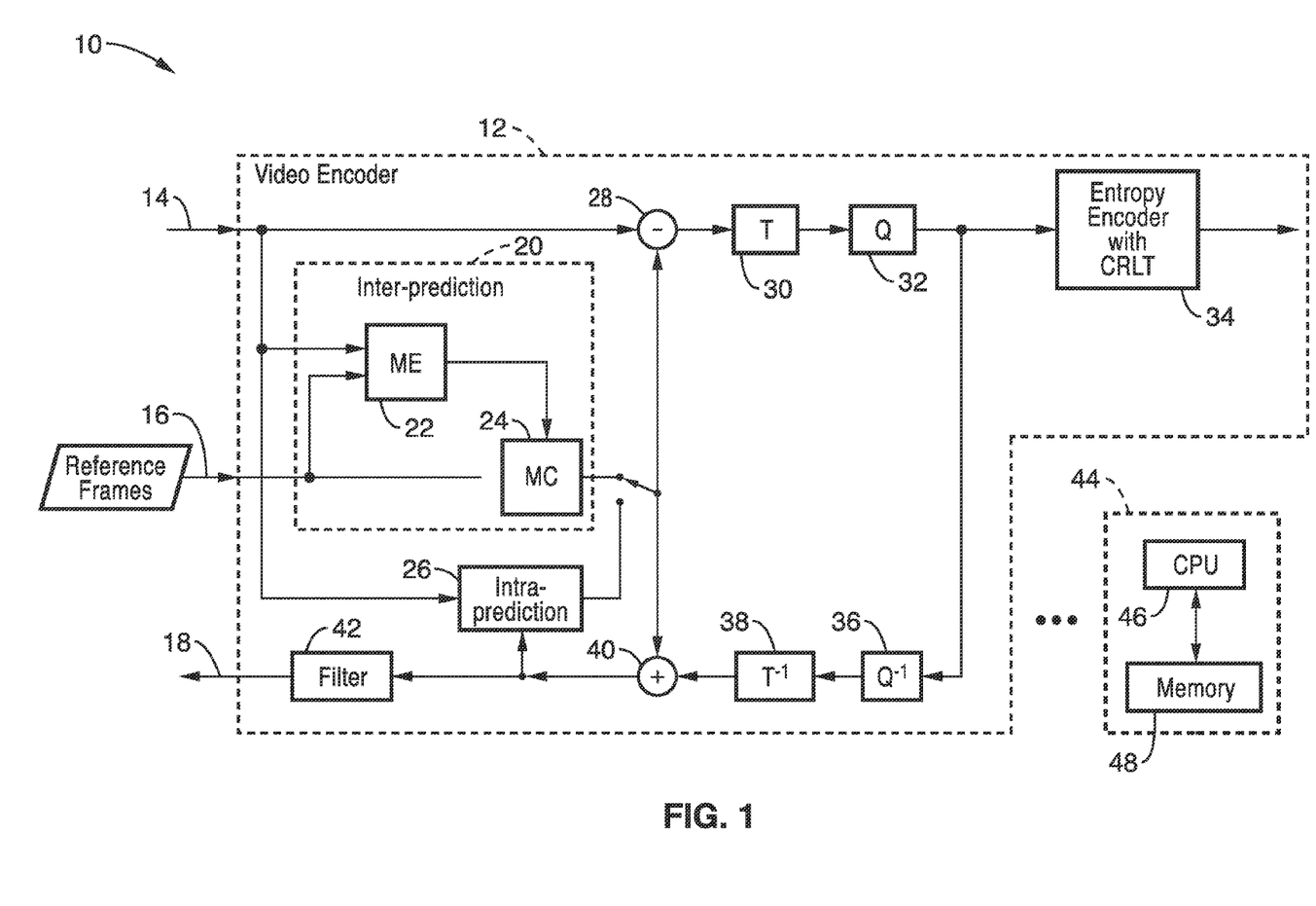
FIG. 1 is a schematic of a video encoder configured for context reduced last transform (CRLT) position coding according to an embodiment of the present invention.

FIG. 1 illustrates an exemplary embodiment of a video coding apparatus (encoder) 10 according to the invention for performing encoding which includes CRLT coding during entropy coding, but which can otherwise rely on conventional video coding toward maximizing compatibility with various coding systems.

The encoder 10 is shown with encoding elements 12 executed by a processing means 44. In this embodiment, a video frame input 14 is shown along with a reference frames input 16 and a video frame output 18. Inter-prediction 20 is depicted with motion estimation (ME) 22 and motion compensation (MC) 24. Intra-prediction 26 is also shown, and switching is provided between inter-prediction and intra-prediction. A minus junction 28 is shown with an output to a forward transform 30, a quantization stage 32, and an entropy encoder 34 that includes context reduced last transform (CRLT) position coding according to the invention. Inverse quantization 36 and inverse transform 38 operations are shown coupled to a summing junction 40 followed by a filter 42, such as a deblocking and/or loop filter.

It should be appreciated that the encoder is shown implemented with a processing means 44, such as comprising at least one processing device (e.g., CPU) 46 and at least one memory 48 for executing programming associated with the encoding. In addition, it will be appreciated that elements of the present invention can be implemented as programming stored on a computer-readable media, which can be accessed for execution by a CPU for the encoder 10 shown in FIG. 1 and/or the decoder 50 shown in FIG. 2. It should be appreciated that the computer-readable media, for this and other embodiments described herein, is a "non-transitory" computer-readable media only insofar as transitory electronic signals are precluded, while not limiting the forms of memory devices and other computer readable media which may be incorporated in various embodiments of the present invention.

Figure 2:
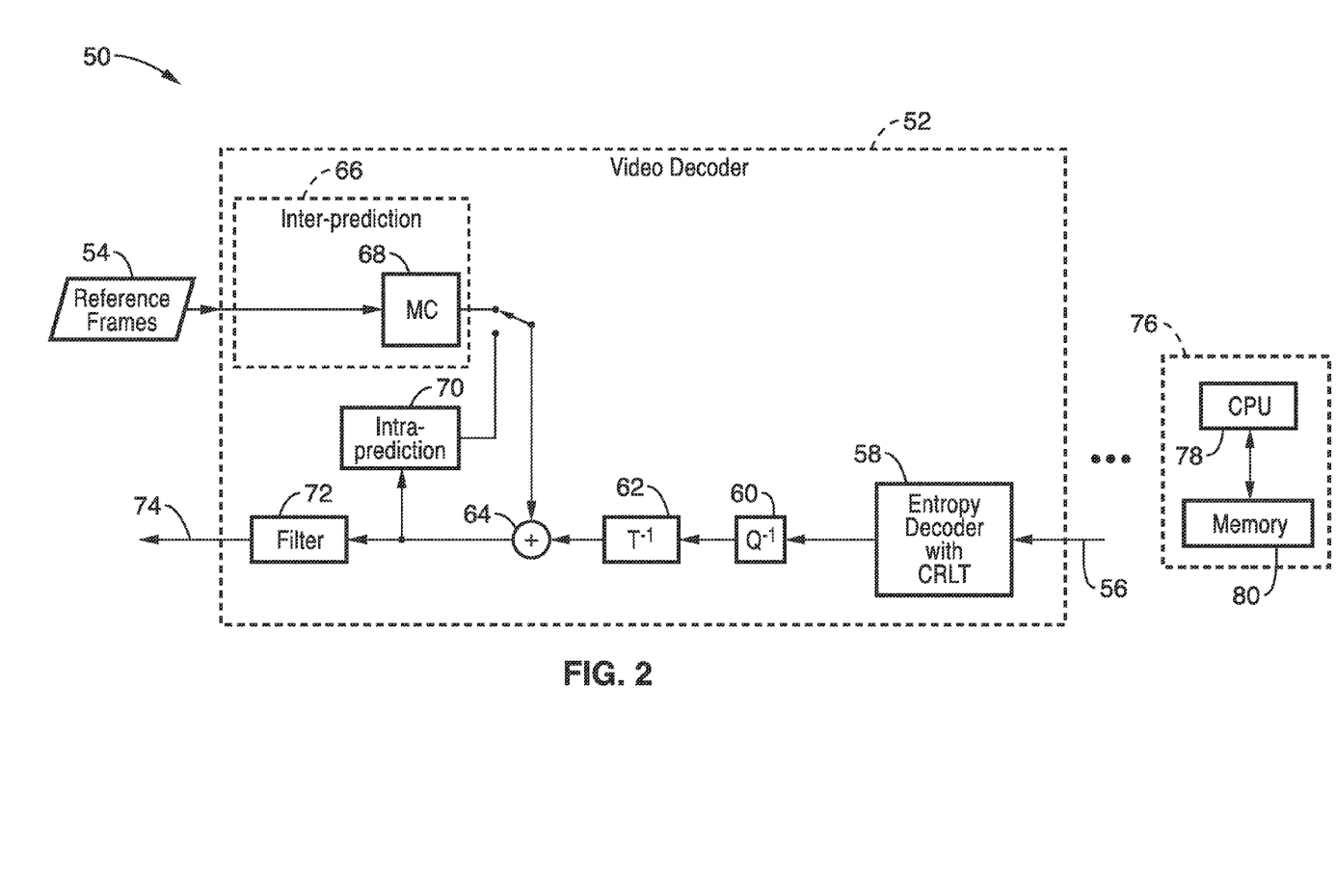
FIG. 2 is a schematic of a video decoder configured for context reduced last transform (CRLT) position decoding according to an embodiment of the present invention.

FIG. 2 illustrates an exemplary embodiment of a video decoding apparatus (decoder) 50 according to the invention, shown with process blocks 52 and an associated processing means 76. It will be noted that the decoder is substantially a subset of the elements contained in encoder 10 of FIG. 1, operating on reference frames 54 and outputting video 74. The decoder receives an encoded video signal 56 which is processed through entropy decoder 58 including context reduced last transform (CRLT) decoding, inverse quantization 60 and inverse transform 62. Summing 64 is shown between the inverse transform 62 output and the selection between inter-prediction 66 shown with motion compensation 68, and a separate intra-prediction block 70. Output from summing junction 64 is received by filter 72, which can be configured as a loop filter, a deblocking filter, or any combination thereof. It should be appreciated that the decoder processing means 76 comprises at least one processing device 78 and at least one memory 80 for executing programming associated with the decoder. In addition, it will be noted that elements of the present invention can be implemented as programming stored on a non-transitory computer-readable media, wherein said media can be accessed for execution by processing device (CPU) 78.

It will be appreciated that the encoder 10 shown in FIG. 1 and the decoder 50 shown in FIG. 2 are preferably implemented by a processing means 44 and 76, respectively, such as in response to programming resident in memory 48 and 80 which is executable on CPU 46 and 78. In addition, it will be appreciated that elements of the present invention can be implemented as programming stored on a media, wherein said media can be accessed for execution by CPU 46 and 78.

It should be appreciated that the programming is executable from the memory which is a tangible (physical) computer readable media that is non-transitory in that it does not merely constitute a transitory propagating signal, but is actually capable of retaining programming, such as within any desired form and number of static or dynamic memory devices. These memory devices need not be configured to maintain data under all conditions (e.g., power fail) to be considered herein as non-transitory media.

FIG. 3A through FIG. 3D depict state-of-the-art use of contexts according to the parallel coding utilizing multiple contexts proposed in JCTVC-D262. By way of example, contexts are only shown for the X coordinate, with contexts being separately but likewise utilized along the Y coordinate. It will be noted that position along the X coordinate is a position along the width (horizontal) of the block, while a position along the Y coordinate is a position along the height (vertical) of the block. The example shows the sharing of select contexts, indicated by use of the same context number in select consecutive bins.

Figure 3A:
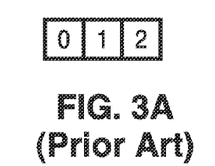
Figure 3B:
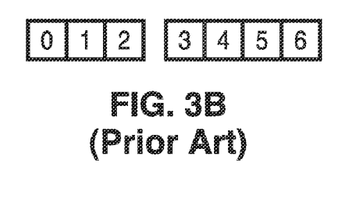
Figures 3C, 3D:
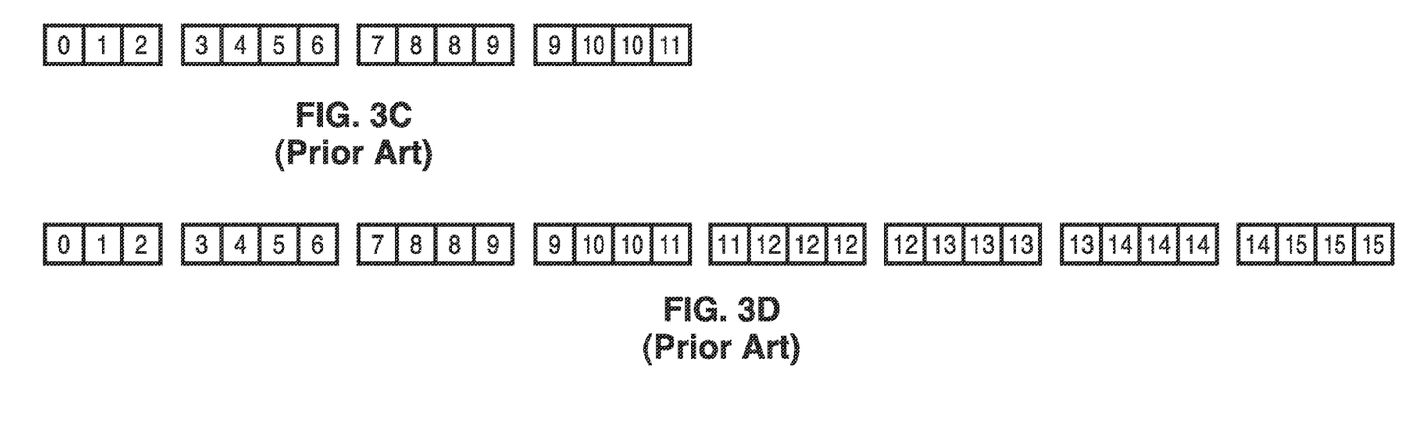

The number of context models required in this example are 3, 7, 12 and 16 context models, for block widths of 4, 8, 16 and 32 respectively. Specifically, X coordinate Luma coding is shown, with a block width of 4 bins requiring 3 context models (FIG. 3A), with a block width of 8 bins requiring 7 context models (FIG. 3B), with a block width of 16 bins requiring 12 context models (FIG. 3C), and with a block width of 32 bins requiring 16 context models (FIG. 3D).

It is seen then that for the luminance X coordinate, this method requires a total of 3+7+12+16=38 contexts. For a YUV 4:2:0 video, the largest block width for chrominance is 16, and it requires a total of 3+7+12=22 contexts.

FIG. 4A through FIG. 4D illustrate context model utilization in CRLT according to an embodiment of the invention. Comparing these figures with FIG. 3A through FIG. 3D, it will noted that contexts 4, 6, 8, 10, 15, have been removed from FIG. 4A through FIG. 4D. In addition, under select bin width and encoding conditions, context 11 is also removed, as for an X coordinate Luma with a width of 16. The example in FIG. 4A through FIG. 4D shows the unused context bins as shaded, with the number of context models required as 3, 5, 7 and 11 context models, for a total of 26 context models for luminance, compared to 38 context models for the technique shown in FIG. 3A through FIG. 3D. As seen in FIG. 4A through 4D, the context assignment for block width of 4 (FIG. 4A) is the same as in JCTVC-D262, while for a block width of 8 (FIG. 4B) contexts 4 and 6 are removed relative to JCTVC-D262, and for a block width of 16 (FIG. 4C) contexts 4, 6, 8, 10, 11 are removed in relation to JCTVC-D262, while finally, for a block width of 32 (FIG. 4D) contexts 4, 6, 8, 10, 15 are also removed in relation to that of JCTVC-D262. It will be noted that context 11 is removed under certain conditions, of bin width and type of encoding.

Figure 4A:
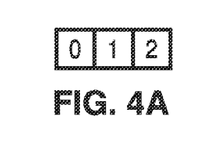
Figure 4B:
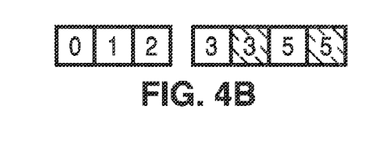
Figure 4C:
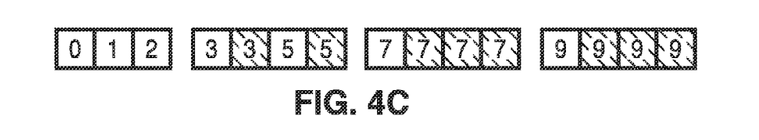
Figure 4D:
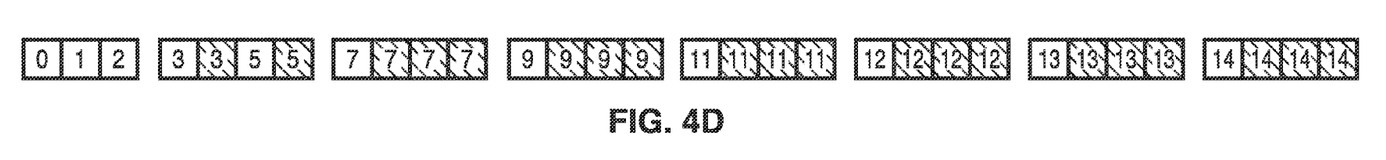

Specifically, the figures show the result of X coordinate Luma coding according to the invention with a block width of 4 bins requiring 3 context models (FIG. 4A), with a block width of 8 bins requiring 5 context models (FIG. 4B), with a block width of 16 bins requiring 7 context models (FIG. 4C), and with a block width of 32 bins requiring 11 context models (FIG. 4D).

Table 1 through Table 6 illustrate example bit rate differences. Tables 1 through 3 depict bit rate difference (BD) between the multiple contexts technique proposed within JCTVC-D262 and the released high efficiency video coding (HEVC) test model HM 2.0. Tables 4 through 6 depict BD rate between the inventive CRLT technique and HM 2.0. These tables are shown in response to different configurations of HEVC, specifically, intra-coding in Tables 1, 4; random access in Tables 2, 5; and low delay in Tables 3, 6. It can be seen from these tables that the bit rates provided according to the invention are comparable with that of the HEVC test model (HM 2.0) and video coding under JCTVC-D262.

In regard to bin count statistics, there were virtually no differences between the inventive CRLT and JCTVC-D262. The inventive CRLT approach however, showed a reduction in bin count over the HEVC test model (HM 2.0), including reductions of about 5% for intra-coding and 2% for random access.

Figure 5:
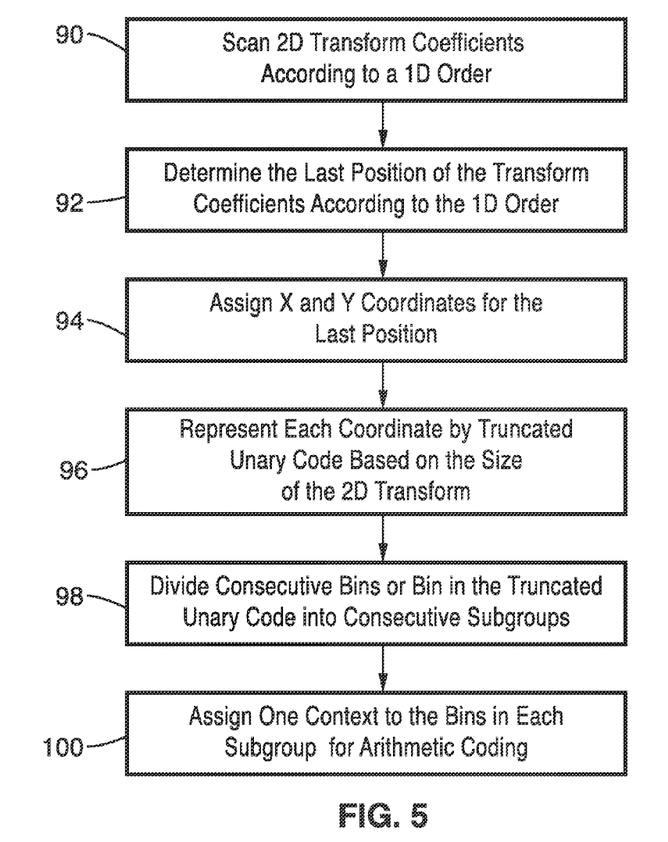
FIG. 5 is a flow diagram of context reduced last transform (CRLT) position coding utilizing unary coding according to an embodiment of the present invention.

FIG. 5 illustrates an example embodiment of context reduced last transform (CRLT) coding according to the invention utilizing unary coding (e.g., truncated unary coding). In block 90 a scan of 2D transform coefficients is performed according to a 1D order (X or Y direction). Next, the last position of the transform coefficients is determined in block 92 according to the 1D order. X and Y coordinates are then assigned for the last position in block 94. Each coordinate is then mathematically represented, as in this embodiment by truncated unary coding in block 96, based on the size of the 2D transform. Consecutive bins are then divided in the truncated unary code into consecutive sub groups as per block 98. Finally, assignment of one context to the bins in each subgroup is made in block 100 for arithmetic coding, wherein bins are shared in response to bin width, with all but the first three bins sharing a context model with at least one other bin.

Figure 6:
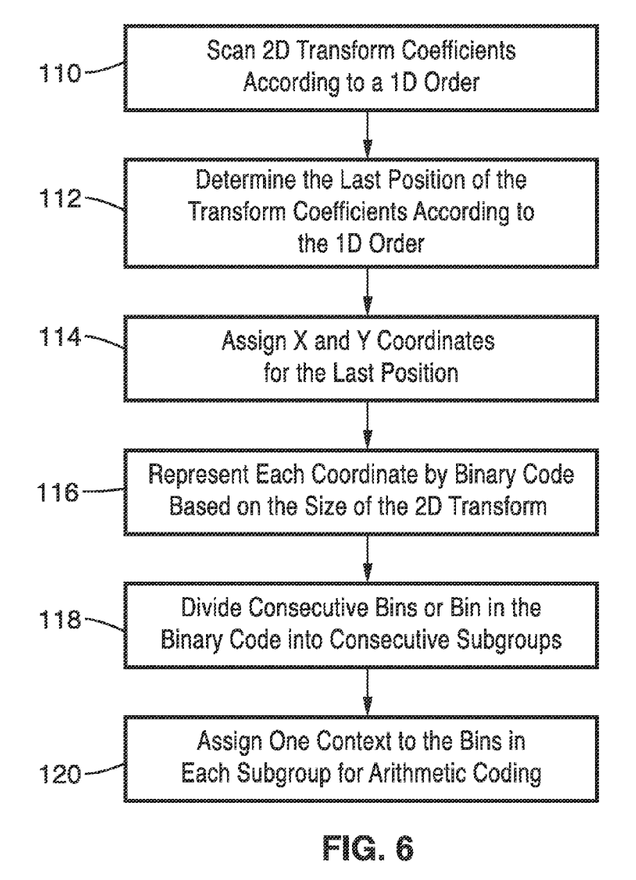
FIG. 6 is a flow diagram of context reduced last transform (CRLT) position coding utilizing binary coding according to an embodiment of the present invention.

FIG. 6 illustrates an example embodiment of context reduced last transform (CRLT) coding according to the invention utilizing binary coding according to the invention.

In block 110 a scan of 2D transform coefficients is performed according to a 1D order (X or Y direction). Next, the last position of the transform coefficients is determined in block 112 according to the 1D order. X and Y coordinates are then assigned for the last position in block 114. Each coordinate is then mathematically represented, as in this embodiment by binary coding in block 116, based on the size of the 2D transform. Consecutive bins are then divided in the truncated unary code into consecutive sub groups as per block 118. Finally, assignment of one context to the bins in each subgroup is made in block 120 for arithmetic coding, whereby bins are shared in response to bin width, with all but the first three bins sharing a context model with at least one other bin.

From the description herein, it will be further appreciated that the invention can be embodied in various ways, which include but are not limited to the following. As can be seen, therefore, the present invention includes the following inventive embodiments among others:

1. An apparatus for encoding video, comprising: a computer adapted for video encoding; and programming configured for execution on said computer for: performing predictions to reduce inter-frame or intra-frame redundancies; performing entropy encoding of binary bits to communicate selection of motion vectors; encoding a position for a last significant coefficient during entropy encoding, prior to encoding positions of other significant coefficients, and in response to selecting a context model from a selection of available context models; and assigning context models within a significance map according to block width to eliminate a number of context models toward simplifying entropy encoding processing.

2. The apparatus of embodiment 1, wherein all bins of the block width except a first three bins share a context model with at least one other bin.

3. The apparatus of embodiment 1, wherein said assigning of context models comprises removing context models 4, 6, 8, 10, and 15, or a subset thereof for significance maps having a block width less than 32.

4. The apparatus of embodiment 3, further comprising programming configured for execution on said computer for additionally removing context model 11 for block widths of 16.

5. The apparatus of embodiment 1, wherein said assigning of context models comprises re-assigning the context models 3, 5, 7, 9, 11, 12, 13, 14 for use on other bins, or a subset thereof for significance maps having a block width less than 32.

6. The apparatus of embodiment 1, wherein said entropy encoding comprises context adaptive binary arithmetic coding (CABAC).

7. The apparatus of embodiment 1, wherein said encoding of the position of the last significant coefficient comprises explicitly encoding said position of the last coefficient by signaling its X and Y coordinates with a binary or unary code, with X and Y coordinates signaled independently.

8. The apparatus of embodiment 1, wherein said encoding comprises high efficiency video coding (HEVC).

9. The apparatus of embodiment 1, wherein said encoding comprises H.264/MPEG-4 AVC video encoding.

10. An apparatus for encoding video, comprising: a computer adapted for video encoding; and programming configured for execution on said computer for: performing predictions to reduce inter-frame or intra-frame redundancies; entropy encoding, utilizing context adaptive binary arithmetic coding (CABAC), to communicate selection of motion vectors; encoding a position of a last significant coefficient during entropy encoding, prior to encoding position of other significant coefficients, and in response to selecting a context model from a selection of available context models; and assigning context models within a significance map according to block width to eliminate a number of context models, and in which all bins in the block width except a first three bins share a context model with at least one other bin, toward simplifying entropy encoding processing.

11. The apparatus of embodiment 10, wherein said assigning of context models comprises removing context models 4, 6, 8, 10, and 15, or a subset thereof for significance maps having block widths less than 32.

12. The apparatus of embodiment 11, further comprising programming configured for execution on said computer for additionally removing context model 11 for significance maps having a block width of 16.

13. The apparatus of embodiment 10, wherein said assigning of context models comprises re-assigning context models 3, 5, 7, 9, 11, 12, 13, 14 for use on other bins, or re-assigning a subset thereof for significance maps having a block width of less than 32.

14. The apparatus of embodiment 10, wherein said encoding position of the last significant coefficient comprises explicitly encoding said position of the last significant coefficient by signaling its X and Y coordinates with a binary or unary code, with X and Y coordinates signaled independently.

15. The apparatus of embodiment 10, wherein said encoding comprises high efficiency video coding (HEVC).

16. The apparatus of embodiment 10, wherein said encoding comprises H.264/MPEG-4 AVC video encoding.

17. A method of video encoding, comprising: performing predictions, within a video encoder, to reduce inter-frame or intra-frame redundancies; entropy encoding of binary bits to communicate selection of motion vectors; encoding position of a last significant coefficient during entropy encoding, prior to encoding positions of other significant coefficients and in response to selecting a context model from a selection of available context models; and assigning context models within a significance map according to block width, and in which all bins in the block width, except a first three bins, share a context model with at least one other bin to eliminate a number of context models toward simplifying entropy encoding processing.

18. The method of embodiment 17, wherein said assigning of context models comprises removing context models 4, 6, 8, 10, and 15, or a subset thereof for significance maps having a block width of less than 32.

19. The method of embodiment 18, further comprising additionally removing context 11 for significance maps having a block width of 16 for select forms of encoding.

20. The method of embodiment 17, wherein said assigning of context models comprises re-assigning context models 3, 5, 7, 9, 11, 12, 13, 14 for use on other bins of the block width, or re-assigning a subset thereof for significance maps having block widths of less than 32.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

BD-Rate Changes for JCTVC-D262 on Intra Coding vs. HM 2.0

| | Intra coding (BD-rate) | | |
|---|---|---|---|
| Class | Y | U | V |
| A | −0.2 | −0.2 | −0.1 |
| B | −0.1 | 0.1 | 0.1 |
| C | 0.1 | 0.1 | 0.1 |
| D | −0.1 | 0.0 | 0.1 |
| E | 0.1 | 0.0 | −0.2 |
| All | 0.0 | 0.0 | 0.0 |

TABLE 2

BD-Rate Changes for JCTVC-D262 on Random Access vs. HM 2.0

| | Random Access (BD-rate) | | |
|---|---|---|---|
| Class | Y | U | V |
| A | −0.1 | −1.1 | −0.9 |
| B | 0.0 | −0.6 | −0.5 |
| C | 0.1 | −0.9 | −0.8 |
| D | 0.0 | −1.2 | −0.9 |
| E | — | — | — |
| All | 0.0 | −0.9 | −0.7 |

TABLE 3

BD-Rate Changes for JCTVC-D262 on Low Delay vs. HM 2.0

| | Low Delay (BD-rate) | | |
|---|---|---|---|
| Class | Y | U | V |
| A | — | — | — |
| B | −0.1 | −1.4 | −1.7 |
| C | −0.1 | −1.5 | −1.4 |
| D | −0.2 | −2.9 | −3.1 |
| E | −0.1 | −2.3 | −1.1 |
| All | −0.1 | −1.9 | −1.9 |

TABLE 4

BD-Rate Changes for CRLT with Intra Coding vs. HM 2.0

| | Intra coding (BD-rate) | | |
|---|---|---|---|
| Class | Y | U | V |
| A | −0.2 | −0.2 | −0.2 |
| B | −0.1 | 0.0 | 0.1 |
| C | 0.1 | 0.1 | 0.1 |
| D | −0.1 | −0.1 | 0.1 |
| E | 0.1 | −0.1 | −0.2 |
| All | 0.0 | 0.0 | 0.0 |

TABLE 5

BD-Rate Changes for CRLT for Random Access vs. HM 2.0

| | Random Access (BD-rate) | | |
|---|---|---|---|
| Class | Y | U | V |
| A | −0.1 | −1.0 | −1.5 |
| B | 0.0 | −0.6 | −0.6 |
| C | 0.1 | −0.9 | −0.7 |
| D | 0.0 | −1.3 | −0.8 |
| E | — | — | — |
| All | 0.0 | −0.9 | −0.9 |

TABLE 6

BD-Rate Changes for CRLT for Low Delay vs. HM 2.0

| | Low Delay (BD-rate) | | |
|---|---|---|---|
| Class | Y | U | V |
| A | — | — | — |
| B | −0.1 | −1.3 | −1.8 |
| C | 0.0 | −1.5 | −1.3 |
| D | −0.3 | −3.0 | −2.8 |
| E | −0.2 | −2.0 | −0.8 |
| All | −0.1 | −1.9 | −1.7 |

What is claimed is:

1. An apparatus for encoding video, comprising: a computer adapted for video encoding; and programming configured for execution on said computer for:
    performing predictions to reduce inter-frame or intra-frame redundancies;
    performing entropy encoding of binary bits to communicate selection of motion vectors;
    encoding a position for a last significant coefficient during entropy encoding, prior to encoding positions of other significant coefficients, and in response to selecting a context model from a selection of available context models; and
    assigning context models within a significance map according to block width to eliminate a number of context models toward simplifying entropy encoding processing; wherein all bins of the block width except a first three bins share a context model with at least one other bin.

2. The apparatus as recited in claim 1, wherein said assigning of context models comprises removing context models 4, 6, 8, 10, and 15, or a subset thereof for significance maps having a block width less than 32.

3. The apparatus as recited in claim 2, further comprising programming configured for execution on said computer for additionally removing context model 11 for block widths of 16.

4. The apparatus as recited in claim 1, wherein said assigning of context models comprises re-assigning the context models 3, 5, 7, 9, 11, 12, 13, 14 for use on other bins, or a subset thereof for significance maps having a block width less than 32.

5. The apparatus as recited in claim 1, wherein said entropy encoding comprises context adaptive binary arithmetic coding (CABAC).

6. The apparatus as recited in claim 1, wherein said encoding of the position of the last significant coefficient comprises explicitly encoding said position of the last coefficient by signaling its X and Y coordinates with a binary or unary code, with X and Y coordinates signaled independently.

7. The apparatus as recited in claim 1, wherein said encoding comprises high efficiency video coding (HEVC).

8. The apparatus as recited in claim 1, wherein said encoding comprises H.264/MPEG-4 AVC video encoding.

9. An apparatus for encoding video, comprising: a computer adapted for video encoding; and programming configured for execution on said computer for:
    performing predictions to reduce inter-frame or intra-frame redundancies;
    entropy encoding, utilizing context adaptive binary arithmetic coding (CABAC), to communicate selection of motion vectors;
    encoding a position of a last significant coefficient during entropy encoding, prior to encoding position of other significant coefficients, and in response to selecting a context model from a selection of available context models; and
    assigning context models within a significance map according to block width to eliminate a number of context models, and in which all bins in the block width except a first three bins share a context model with at least one other bin, toward simplifying entropy encoding processing.

10. The apparatus as recited in claim 9, wherein said assigning of context models comprises removing context models 4, 6, 8, 10, and 15, or a subset thereof for significance maps having block widths less than 32.

11. The apparatus as recited in claim 10, further comprising programming configured for execution on said computer for additionally removing context model 11 for significance maps having a block width of 16.

12. The apparatus as recited in claim 9, wherein said assigning of context models comprises re-assigning context models 3, 5, 7, 9, 11, 12, 13, 14 for use on other bins, or re-assigning a subset thereof for significance maps having a block width of less than 32.

13. The apparatus as recited in claim 9, wherein said encoding position of the last significant coefficient comprises explicitly encoding said position of the last significant coefficient by signaling its X and Y coordinates with a binary or unary code, with X and Y coordinates signaled independently.

14. The apparatus as recited in claim 9, wherein said encoding comprises high efficiency video coding (HEVC).

15. The apparatus as recited in claim 9, wherein said encoding comprises H.264/MPEG-4 AVC video encoding.

16. A method of video encoding, comprising:
  performing predictions, within a video encoder, to reduce inter-frame or intra-frame redundancies;
  entropy encoding of binary bits to communicate selection of motion vectors;
  encoding position of a last significant coefficient during entropy encoding, prior to encoding positions of other significant coefficients and in response to selecting a context model from a selection of available context models; and
  assigning context models within a significance map according to block width, and in which all bins in the block width, except a first three bins, share a context model with at least one other bin to eliminate a number of context models toward simplifying entropy encoding processing.

17. The method as recited in claim 16, wherein said assigning of context models comprises removing context models 4, 6, 8, 10, and 15, or a subset thereof for significance maps having a block width of less than 32.

18. The method as recited in claim 17, further comprising additionally removing context 11 for significance maps having a block width of 16 for select forms of encoding.

19. The method as recited in claim 16, wherein said assigning of context models comprises re-assigning context models 3, 5, 7, 9, 11, 12, 13, 14 for use on other bins of the block width, or re-assigning a subset thereof for significance maps having block widths of less than 32.

\* \* \* \* \*